(12) United States Patent
Koizumi et al.

(10) Patent No.: US 7,314,284 B2
(45) Date of Patent: Jan. 1, 2008

(54) RETROREFLECTION SHEETING AND FILM FOR USE IN RETROREFLECTION SHEETING

(75) Inventors: Keishi Koizumi, Settsu (JP); Kazushi Nakatani, Suita (JP)

(73) Assignee: Kaneka Corporation, Osaka (JP)

( * ) Notice: Subject to any disclaimer, the term of this patent is extended or adjusted under 35 U.S.C. 154(b) by 5 days.

(21) Appl. No.: 10/583,342

(22) PCT Filed: Dec. 14, 2004

(86) PCT No.: PCT/JP2004/018991

§ 371 (c)(1),
(2), (4) Date: Jun. 19, 2006

(87) PCT Pub. No.: WO2005/059605

PCT Pub. Date: Jun. 30, 2005

(65) Prior Publication Data

US 2007/0159696 A1    Jul. 12, 2007

(30) Foreign Application Priority Data

Dec. 17, 2003  (JP) .............................. 2003-420206

(51) Int. Cl.
*G02B 5/124* (2006.01)

(52) U.S. Cl. ...................... 359/530; 359/529; 359/834; 428/327

(58) Field of Classification Search ..................... None
See application file for complete search history.

(56) References Cited

U.S. PATENT DOCUMENTS

| 2,481,757 | A |   | 9/1949 | Jungersen |
| 6,318,866 | B1 | * | 11/2001 | Mimura et al. ............. 359/530 |
| 6,700,701 | B1 | * | 3/2004 | Son et al. .................... 359/443 |

2003/0223137 A1    12/2003  Araki et al.

FOREIGN PATENT DOCUMENTS

| EP | 0 609 880 A1 | 8/1994 |
| EP | 1 136 847 A2 | 9/2001 |
| JP | 58-204401 A | 11/1983 |

(Continued)

*Primary Examiner*—James Phan
(74) *Attorney, Agent, or Firm*—Sughrue Mion, Pllc.

(57) ABSTRACT

An object of the present invention is to provide a retroreflective sheeting that exhibits proper retroreflection even at a small incident angle with no or less halation, and has superior incident angularities and superior direction characteristics, as well as a film for use in the retroreflective sheeting. The retroreflective sheeting with the above characteristics is obtained by forming reflective elements of a specific triangular pyramidal frustum configuration in a close-packed state on one surface thereof. The shape of the triangular pyramid frustum element satisfies following requirements: one side length of the bottom surface is in the range of 50 to 400 μm, and a difference between a longest side and a shortest side is 200 μm or less; the length of a longest edge is in the range of 50 to 400 μm, and a difference between the longest edge and a shortest edge among the three edges is 100 μm or less; when a vertical line which intersects perpendicularly with the bottom surface is drawn from a top surface to the bottom surface, the length of a longest vertical line is in the range of 20 to 250 μm; and an angle between adjacent side surfaces is in the range of 85 to 95 degrees.

12 Claims, 6 Drawing Sheets

FOREIGN PATENT DOCUMENTS

| | | |
|---|---|---|
| JP | 6-160615 A | 6/1994 |
| JP | 6-250006 A | 9/1994 |
| JP | 6-347623 A | 12/1994 |
| JP | 8-201608 A | 8/1996 |
| JP | 9-212115 A | 8/1997 |
| JP | 9-304605 A | 11/1997 |
| JP | 10-253808 A | 9/1998 |
| JP | 11-101905 A | 4/1999 |
| JP | 11-237506 A | 8/1999 |
| JP | 2001-21708 A | 1/2001 |
| JP | 2001-33609 A | 2/2001 |
| JP | 6-264525 A | 9/2001 |
| JP | 2003-84113 A | 3/2003 |
| WO | WO 97/28472 A1 | 8/1997 |
| WO | WO 98/18028 A1 | 4/1998 |

* cited by examiner

RETROREFLECTION SHEETING AND FILM FOR USE IN RETROREFLECTION SHEETING

TECHNICAL FIELD

The present invention relates to a retroreflective sheeting with prism elements of a novel structure. More specifically, the invention relates to a retroreflective sheeting comprising a reflective element layer containing triangular pyramidal frustum prism elements of a novel structure, as well as a resin film for use in the retroreflective sheeting.

BACKGROUND ART

The retroreflective sheeting is used for signboards such as road signboards and construction site signboards, car license plates of automotive vehicles such as automobiles and motorcycles, and safety materials such as collision warning signboards, clothing, and life jackets.

There are proposed some techniques of obtaining retroreflection by embedding micro glass beads in a resin sheet and utilizing refraction of the glass beads (see Japanese Unexamined Patent Publication No. 6-160615, Japanese Unexamined Patent Publication No. 6-347623, and Japanese Unexamined Patent Publication No. 9-212115). In the proposed techniques, even if an angle (hereinafter, called as "incident angle") formed between a vertical line perpendicularly intersecting a surface of the resin sheet, and light incident on the resin sheet is increased, lowering of retroreflective performance (sometimes called as "coefficient of retroreflection") is suppressed (in other words, superior incident angularities are obtained). However, in the above arrangement, the absolute value of a luminance factor (i.e. a coefficient of retroreflection) is small, which obstructs acquiring sufficient retroreflection. In addition to the above drawback, since segregation of the glass beads from the resin is impossible, segregation recycling is impossible, and incineration is impossible. Accordingly, disposal by landfill is the only measure, which may increase environmental load.

In order to solve the above drawbacks, a triangular-pyramidal cube-corner retroreflective sheeting with elements has been proposed. With the retroreflective sheeting, segregation recycling is possible, which may reduce environmental load. Also, the retroreflective sheeting provides an improved luminance factor (i.e. an improved coefficient of retroreflection), and accordingly, provides superior retroreflection against incident light of a specific incident angle. However, the incident angularities are poor. In other words, the retroreflective sheeting above exhibits a desirable retrorefliective performance while the incident angle is small, but the retroreflective performance is sharply degraded as the incident angle is increased.

In the triangular-pyramidal cube-corner retroreflective sheeting above, reflected light is less likely to be diffusely reflected in a wide angle, as compared with the glass beads type retroreflective sheeting. Accordingly, in practical use of the retroreflective sheeting above, in the case where light emitted from a headlamp of an automobile is retroreflected on a traffic signboard, for instance, the retroreflected light may be hard to reach the driver's eyes if the driver is located on an off-axis position of the optical axis of the retroreflected light due to the narrow diffuse angle of the retroreflected light. The drawback becomes conspicuous particularly when the automobile comes close to the traffic signboard, because the angle (hereinafter, called as "observation angle") formed between the axis of the incident light and the axis (observation axis) connecting the driver's position and a reflected point of the incident light on the traffic signboard is increased (that is, observation angularities are degraded).

A retroreflective sheeting obtained by arranging triangular pyramid type reflective elements of various shapes on a thin sheet, and a method for producing the retroreflective sheeting are proposed as an improved approach to solve the above drawbacks (see U.S. Pat. No. 2,481,757). It is described that examples of the triangular pyramid type reflective elements include a triangular pyramid type reflective element, in which the apex of a triangular pyramid is aligned with the center of a base triangle, without a tilt of the optical axis, and a triangular pyramid type reflective element, in which the apex of a triangular pyramid is off the center of a base triangle, with a tilt of the optical axis, to efficiently reflect light against an approaching automobile. The method in the publication above, however, has no specific disclosure about a microsized triangular pyramid type reflective element, and has no recitation on a desirable size and a desirable optical axis tilt of the triangular pyramid type reflective element.

Some approaches are proposed as a measure to solve the above drawbacks by specifying the size of the triangular pyramid type reflective element, and determining a tilt of the optical axis (see Japanese Unexamined Patent Publication No. 6-250006 and Japanese Unexamined Patent Publication No. 2001-264525). However, the improvement is insufficient, and in the case where the coefficient of retroreflection when both the incident angle and the observation angle are small is exceedingly large, halation which makes the recognition of a sign or the like difficult for a driver may likely occur due to too bright reflected light; whereby the driver may be misguided. On the other hand, in the case of where the retroreflection is to be improved when the incident angle is larger, the retroreflective performance (i.e. the coefficient of retroreflection) may be degraded when both the incident angle and the observation angle are small, which may fail to provide sufficiently enhanced incident angularities.

Also, an attention should be paid in attaching a retroreflective sheeting on a base member in view of a drawback that the retroreflective performance is extremely varied between vertical direction and horizontal direction, in other words, direction characteristics are poor. So far, there is no specific technical disclosure to solve the drawback.

Furthermore, it is necessary to provide protruding supports as a constituent member of the retroreflective sheeting having a triangular pyramid type reflective element layer in order to secure an air layer on the back side of the triangular pyramid type reflective elements in firm contact with a backing film (or a backing sheet). However, the reflective element layer having the protruding supports in the firm contact with the backing sheet cannot meet the total internal reflection requirement. Therefore, the retroreflective performance of the retroreflective sheeting with the triangular pyramid type reflective element layer may be degraded.

Moreover, since according to the retroreflective sheetings produced by the aforementioned methods, the triangular pyramidal element has a very sharp apex, in attaching the backing sheet, the sharp apex may be abraded or deformed, which cause undesirable fluctuation of the retroreflective performance, and further, when the retroreflective sheeting is temporarily rolled in after the prism elements are formed, the triangular pyramidal elements may be abraded in the roll, and consequently broken. Since the portion containing the broken prism elements is unusable as a product, and should be disposed of, environmental load may be increased.

DISCLOSURE OF THE INVENTION

In view of the above, an object of the present invention is to provide a retroreflective sheeting that exhibits proper retroreflection even at a small incident angle with no or less halation, and has superior incident angularities and superior direction characteristics, as well as a film for use in the retroreflective sheeting.

As a result of an intensive study, the inventors found that a retroreflective sheeting with reflective elements (microprism elements) of a specific triangular pyramidal frustum configuration causes less halation, and exhibits retroreflection with superior incident angularities and superior direction characteristics, and accomplished the invention.

Specifically, the invention is directed to (1) to (10).

(1) A retroreflective sheeting with triangular pyramidal frustum prism elements, which comprises a reflective element layer containing the triangular pyramidal frustum prism elements in a close-packed state formed on one surface of the retroreflective sheeting, and satisfies the following requirements: the triangular pyramidal frustum prism element has a bottom surface with one side length thereof being in the range of 50 to 400 µm, and a difference between a longest side and a shortest side thereof being 200 µm or less; the length of a longest edge of the triangular pyramidal frustum prism element is in the range of 30 to 400 µm, and a difference between the longest edge and a shortest edge among the three edges thereof is 100 µm or less; when a vertical line which intersects perpendicularly with the bottom surface is drawn from a top surface of the triangular pyramidal frustum prism element to the bottom surface thereof, the length of a longest vertical line is in the range of 20 to 250 µm; and an angle between adjacent side surfaces of the triangular pyramidal frustum prism element is in the range of 85 to 95 degrees.

(2) The retroreflective sheeting having the features recited in (1), the lengths of the three sides of the bottom surface of the triangular pyramidal frustum prism element are different one from another.

(3) The retroreflective sheeting having the features recited in (1) or (2), wherein the area ratio of the top surface of the triangular pyramidal frustum prism element to the bottom surface thereof is in the range of 1/100 to 1/16.

(4) The retroreflective sheeting having the features recited in any one (1) to (3), wherein the reflective element layer is formed on a resin film having a thickness in the range of 30 to 300 µm, and a total light transmittance of 20% or more.

(5) The retroreflective sheeting having the features recited in any one of (1) to (4), wherein the retroreflective sheeting has a backing film made of a resin, the backing film is locally attached to a film having the reflective element layer formed thereon via protruding supports provided by emboss processing in such a manner that an air is sealed between the reflective element layer and the backing film and that a plurality of airtight chambers are formed.

(6) The retroreflective sheeting having the features according to any one of (1) to (5), wherein the backing film is placed adjacent on the top surfaces of the respective triangular pyramidal frustum prism elements without protruding supports.

(7) A resin film for use in a retroreflective sheeting with triangular pyramidal frustum prism elements, which comprises a reflective element layer containing the triangular pyramidal frustum prism elements in a close-packed state formed on one surface of the retroreflective sheeting, wherein the triangular pyramidal frustum prism element has a bottom surface in the shape of a triangle, with one side length thereof being in the range of 50 to 400 µm, and a difference between a longest side and a shortest side thereof being 200 µm or less; when a vertical line which intersects perpendicularly with the bottom surface is drawn from a top surface of the triangular pyramidal frustum prism element to the bottom surface thereof, the length of a longest vertical line is in the range of 20 to 250 µm; and an angle between adjacent side surfaces of the triangular pyramidal frustum prism element is in the range of 85 to 95 degrees.

(8) The resin film having the features recited in (7), wherein the resin film is made of one or more kinds of resins selected from the group consisting of acrylic resin, polycarbonate resin, polystyrene resin, polyester resin, polyethylene resin, polypropylene resin, polyvinylchloride resin, polyarylate resin, polyurethane resin, epoxy resin, fluororesin, and cellulose resin, and the resin film has a thickness in the range of 30 to 300 µm, and a total light transmittance of 20% or more, and is capable of forming the reflective element layer thereon.

(9) The resin film having the features recited in (7) or (8), wherein the resin film contains a UV absorber selected from benzotriazols, benzophenones, triazines, or the like, a light stabilizer selected from hindered amines or the like, an antioxidant including phenols, phosphates, or the like, or a lubricant such as montanic esters or metal stearate salts.

(10) The resin film having the features recited in any one of (7) to (9), wherein the resin film contains an organic dye such as thioxanthenes, coumarins, perylenes, methines, benzopyrans, thioindigos, or anthraquinones, or an organic pigment such as azo pigments or phthalocyanines.

Figure 1:
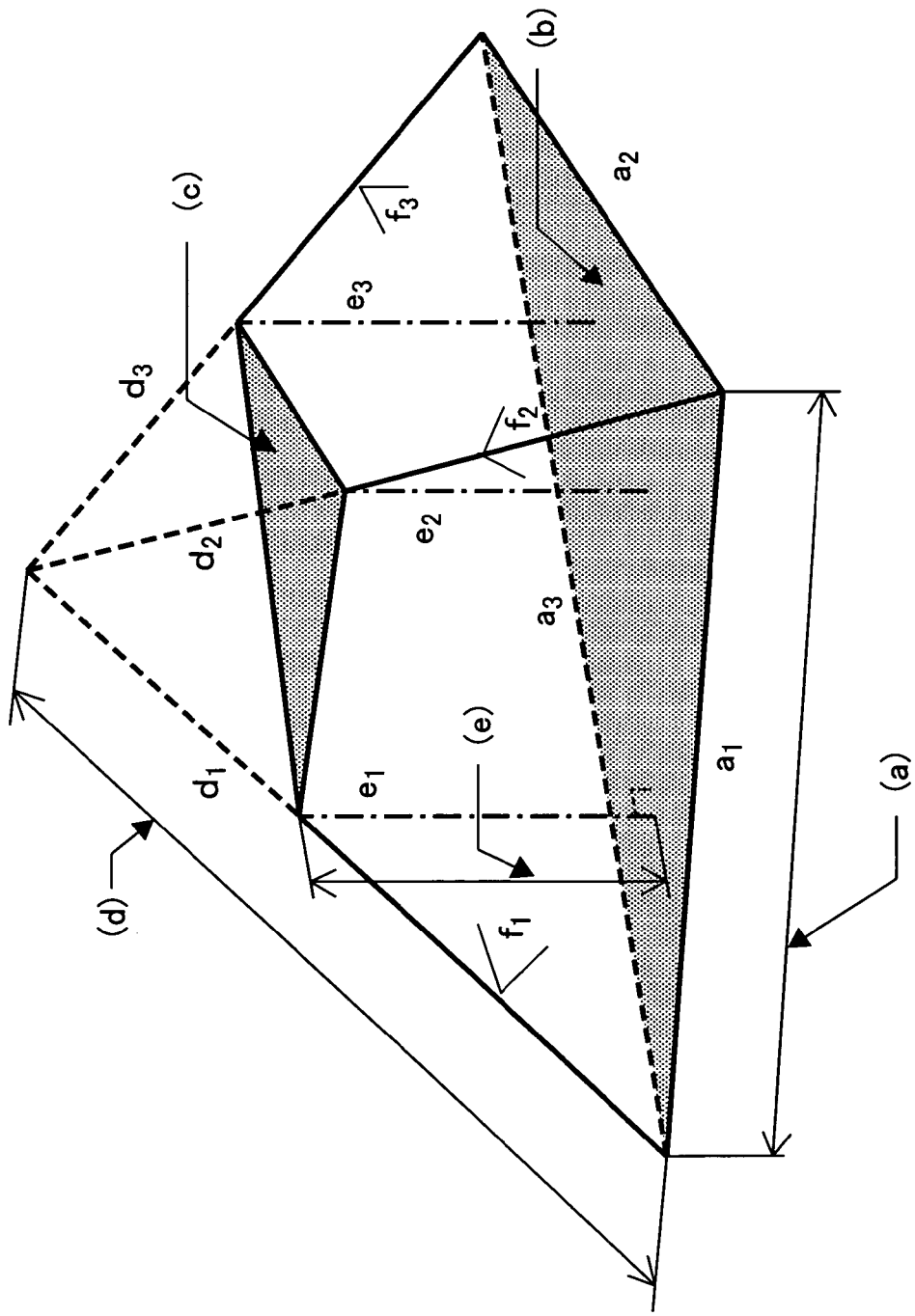
FIG. 1 is a diagram showing configurations and names of portions constituting a triangular pyramidal frustum prism element.
Figure 2:
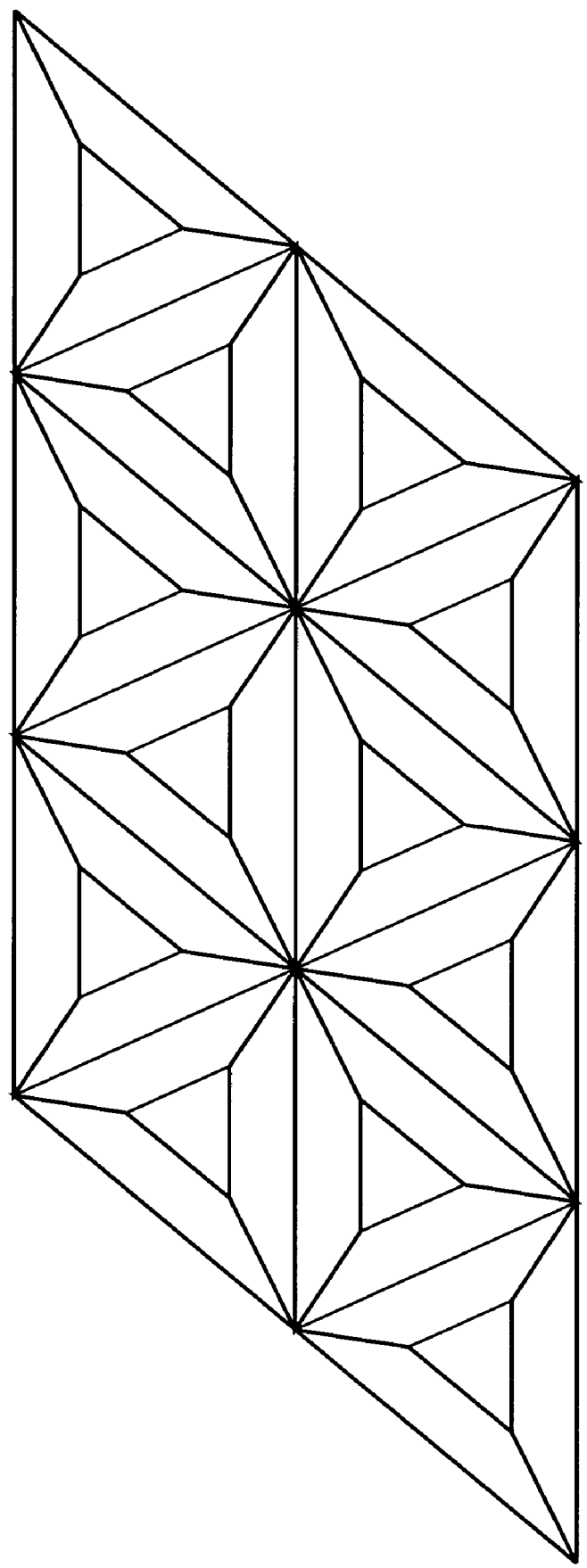
FIG. 2 is a top plan view of a retroreflective sheeting with triangular pyramidal frustum prism elements.

DESCRIPTION ON REFERENCE NUMERALS (a): length of side of bottom surface $a_1$, $a_2$, $a_3$: each side of triangular bottom surface (b): bottom surface (c): top surface (d): longest edge of imaginary triangular pyramid $d_1$, $d_2$, $d_3$: each edge of imaginary triangular pyramid (e): distance between bottom surface and top surface $e_1$, $e_2$, $e_3$: each distance between bottom surface and top surface of triangular pyramidal frustum element $f_1$, $f_2$, $f_3$: each angle between adjacent side surfaces of triangular pyramidal frustum element (1): surface protective layer (2): reflective element layer (triangular pyramidal frustum prism element layer)

(3): prism element containing layer
(4): backing film
(5): jointed site (protruding support)
(6): air layer
11: light source
12: retroreflective sample (retroreflective sheeting)
α: observation angle
β: projection angle (incident angle)
d: observation distance
θ: rotation angle of retroreflective sample
13: receiving aperture
14: spectral analyzer

BEST MODE FOR CARRYING OUT THE INVENTION

A retroreflective sheeting of the invention is a retroreflective sheeting with triangular pyramidal frustum prism elements, in which a reflective element layer containing the triangular pyramidal frustum prism elements in a close-packed state is formed on one surface of the retroreflective sheeting.

The reflective element i.e. a microprism element constituting the inventive retroreflective sheeting has a triangular pyramidal frustum shape. Specifically, the microprism element is the triangular pyramidal frustum shape having the top surface (c), the bottom surface (b), and the three side surfaces (i.e. slant surfaces) as a polyhedron obtained by cutting a triangular pyramid (hereinafter called as "imaginary triangular pyramid") having the triangular bottom surface (b), and three side surfaces (slant surfaces) sharing the bottom surface by a flat plane (i.e. a top surface (c)), and by removing the upper triangular pyramid (hereinafter, also called as "upper portion of the imaginary triangular pyramid").

In the invention, halation that may likely occur in the case where both the incident angle and the observation angle are small can be reduced by forming the microprism elements into the triangular pyramidal frustum shape. Also, this arrangement enables to prevent lowering of retroreflection without impairing the total internal reflection requirement for the microprism elements in firmly attaching a backing film. Furthermore, the arrangement enables to reduce the amount of a waste material due to deformed or missing apex portions of the microprism elements, and to enhance processability on the prism elements.

The shape of the inventive triangular pyramidal frustum element is described referring to FIG. 1.

The bottom surface (b) of the triangular pyramidal frustum element in the invention is a triangle having the features that: one side (a) has the length in the range of 50 to 400 μm, preferably 60 to 300 μm, and more preferably 100 to 250 μm; and that a difference between the longest side and the shortest side is 200 μm or less, preferably 150 μm or less, and more preferably 100 μm or less.

In the case where the length of the one side (a) of the triangular bottom surface (b) is smaller than 50 μm, it is difficult to process the prism elements, and incident angularities tend to be lowered. In the case where the length of the one side (a) of the triangular bottom surface (b) exceeds 400 μm, retroreflective performance tends to be lowered. In the case where a difference between the longest side and the shortest side among the three sides of the triangular bottom surface (b) exceeds 200 μm, in other words, if the bottom surface (b) is an exceedingly long triangle, incident angularities tend to be lowered.

The three sides of the triangular bottom surface (b) in the invention may preferably have different lengths one from another in the aspect of direction characteristics. In the case where the two of the three sides of the triangular bottom surface (b) are equal to each other, in other words, if the bottom surface (b) is an isosceles triangle or an equilateral triangle, direction characteristics tend to be lowered.

The imaginary triangular pyramid for obtaining the triangular pyramidal frustum element of the invention has the features that: the length of the longest edge (d) is in the range of 30 to 400 μm, preferably 50 to 300 μm, and more preferably 80 to 200 μm; and that a difference between the longest edge and the shortest edge among the three edges is 100 μm or less, preferably 90 μm or less, and more preferably 80 μm or less.

In the case where the length of the longest edge (d) of the imaginary triangular pyramid is smaller than 30 μm or exceeds 400 μm, incident angularities and retroreflective performance tend to be lowered. In the case where a difference between the longest edge and the shortest edge among the three edges of the imaginary triangular pyramid exceeds 100 μm, incident angularities and retroreflective performance tend to be lowered.

The top surface (c) of the triangular pyramidal frustum element of the invention is a flat plane formed by cutting off the upper portion of the imaginary triangular pyramid, and is a triangle defined by connecting the intersections with the three edges of the imaginary triangular pyramid.

The triangular pyramidal frustum element of the invention has a feature that the length (e) (hereinafter, called as the longest distance (e) between the top surface (c) and the bottom surface (b) of a longest line among three lines which extend perpendicularly from the respective intersections crossing the top surface (c) with the three edges of the imaginary triangular pyramid to the bottom surface (b) is in the range of 20 to 250 μm, preferably 50 to 200 μm, and more preferably 70 to 150 μm.

In the case where the longest distance (e) between the top surface (c) and the bottom surface (b) is smaller than 20 μm, retroreflective performance tends to be lowered; and in the case where the longest distance (e) exceeds 250 μm, incident angularities tend to be lowered.

It is preferable to set the top surface (c) of the inventive triangular pyramidal frustum element parallel to the bottom surface (b). Setting the top surface (c) of the triangular pyramidal frustum element parallel to the bottom surface enables to improve front retroreflective performance due to specular reflection on the top surface (c) against light incident from a front direction (i.e. light of a small incident angle). Also, the arrangement enables to prevent lowering of retroreflective performance without impairing the total internal reflection requirement for the microprism elements in firmly attaching a backing film. Furthermore, the arrangement enables to enhance processability in processing the microprism elements. It is, however, allowable to set the top surface (c) of the inventive triangular pyramidal frustum element with a slight inclination relative to the bottom surface (b).

Generally, in the case where the top surface (c) of the triangular pyramidal frustum element is set parallel to the bottom surface (b), the triangle of the top surface (c) is similar in shape to the triangle of the bottom surface (b). In this case, it is known that the area ratio of the triangle of the top surface (c) to the triangle of the bottom surface (b) is proportional to square of the ratio of the height of the upper portion of the imaginary triangular pyramid to an assumed height of the imaginary triangular pyramid from the apex thereof. In the triangular pyramidal frustum element having the top surface (c) parallel to the bottom surface (b), the longest distance (e) between the top surface (c) and the bottom surface (b) is obtained by subtracting the height of the upper portion of the imaginary triangular pyramid from the assumed height of the imaginary triangular pyramid.

In the triangular pyramidal frustum element of the invention, the area of the top surface (c) is preferably in the range of $1/100$ to $1/16$ relative to the area of the bottom surface (b), and more preferably in the range of $1/80$ to $1/25$. In the case where the area ratio of the top surface (c) to the bottom surface (b) is smaller than $1/100$, adhesiveness to a base member tends to be lowered. In the case where the area ratio of the top surface (c) to the bottom surface (b) exceeds $1/16$, retroreflective performance tends to be lowered.

The angle (f) between the adjacent side surfaces of the triangular pyramidal frustum element of the invention is in the range of 85 to 95 degrees, preferably 88 to 93 degrees, more preferably 89 to 91 degrees, and most preferably 89.05 to 90.05 degrees. In the case where the angle between the adjacent side surfaces of the triangular pyramidal frustum element is smaller than 85 degrees or exceeds 95 degrees, retroreflective performance tends to be lowered.

The size of the triangular pyramidal microprism elements of the invention may be uniform or varied.

Generally, the retroreflective sheeting with the triangular pyramidal frustum elements of the invention is produced by transferring a triangular pyramidal frustum type microprism pattern onto a flexible and optically transparent resin sheet (resin film), using a molding die (female die) having a metallic die in which an inverted pattern of the triangular pyramidal frustum type microprism pattern is concavely formed in a close-packed state. The resin sheet (resin film) for forming the triangular pyramidal frustum microprism elements to be used in the invention has a thickness in the range of 30 to 300 μm, preferably 50 to 250 μm, and more preferably 100 to 200 μm, and a total light transmittance of 20% or more, preferably 30% or more, and more preferably 60% or more.

In the case where the thickness of the resin sheet (resin film) is smaller than 30 μm, defects such as pinholes may likely to be generated in forming the prism pattern. In the case where the thickness of the resin sheet (resin film) exceeds 300 μm, retroreflective performance tends to be lowered. Also, In the case where the total light transmittance of the resin sheet (resin film) is smaller than 20%, retroreflective performance tends to be lowered.

A resin constituting the resin sheet for forming the triangular pyramidal microprism pattern to be used in the invention may be one or more kinds of resins selected from the group consisting of acrylic resin, polycarbonate resin, polystyrene resin, polyester resin, polyethylene resin, polypropylene resin, polyvinylchloride resin, polyarylate resin, polyurethane resin, epoxy resin, fluororesin, and cellulose resin. Among the above, acrylic resin, polycarbonate resin, and polyarylate resin are preferred in the aspect of transparency of the resin, and processability on the prism elements. Acrylic resin and polyarylate resin are preferred in the aspect of weatherability.

A UV absorber selected from the group of benzotriazols, benzophenones, and triazines to enhance weatherability, a light stabilizer selected from hindered amines, an antioxidant of phenols or phosphates to enhance thermostability, or a lubricant such as montanic esters or metal stearate salts to improve moldability may be added in the resin constituting the resin sheet (resin film) to be used in the invention according to needs.

An organic dye such as thioxanthenes, coumarins, perylenes, methines, benzopyrans, thioindigos, or anthraquinones, or an organic pigment such as phthalocyanines may be added for coloring in the resin constituting the resin sheet (resin film) to be used in the invention according to needs.

An example of the method for producing the molding die (female die) having a metallic die in which an inverted pattern of the triangular pyramidal frustum type microprism pattern is concavely formed in a close-packed state is as follows. First, a male die in which a multitude of microsized triangular pyramidal frustum protrusions are arrayed on a close-packed state is produced by: forming arrays of parallel grooves with a V-shape in cross section in a base member, which is made of a metallic material such as copper and has a smoothly grinded surface, with use of super hard bites (e.g. a diamond bite, a tungsten carbide bite, or the like) having respective tipangles calculated based on an assumed triangular pyramidal shape, with repeated pitches in the respective directions ($a_1$, $a_2$, $a_3$), the predetermined depth of the groove (assumed height of the imaginary triangular pyramid), and the respective angles between the adjacent side surfaces in conformity to the targeted imaginary triangular pyramidal configuration; and cutting off an upper portion of the obtained triangular pyramid in such a manner that the distance between the top surface (c) and the bottom surface (b) is set to a predetermined height. Then, a nickel-made female die with an inverse pattern to the pattern of the male die is produced by electroforming, using the male die.

The method for transferring the reflective element pattern (i.e. the triangular pyramidal frustum microprism pattern) of the invention onto the resin sheet (resin film) is not specifically limited. Various well-known methods such as a method of heating and pressing a die, and a method of forming a die on a roll or a belt, and transferring the pattern of the die onto a resin sheet while feeding the resin sheet may be adopted.

Figure 3:
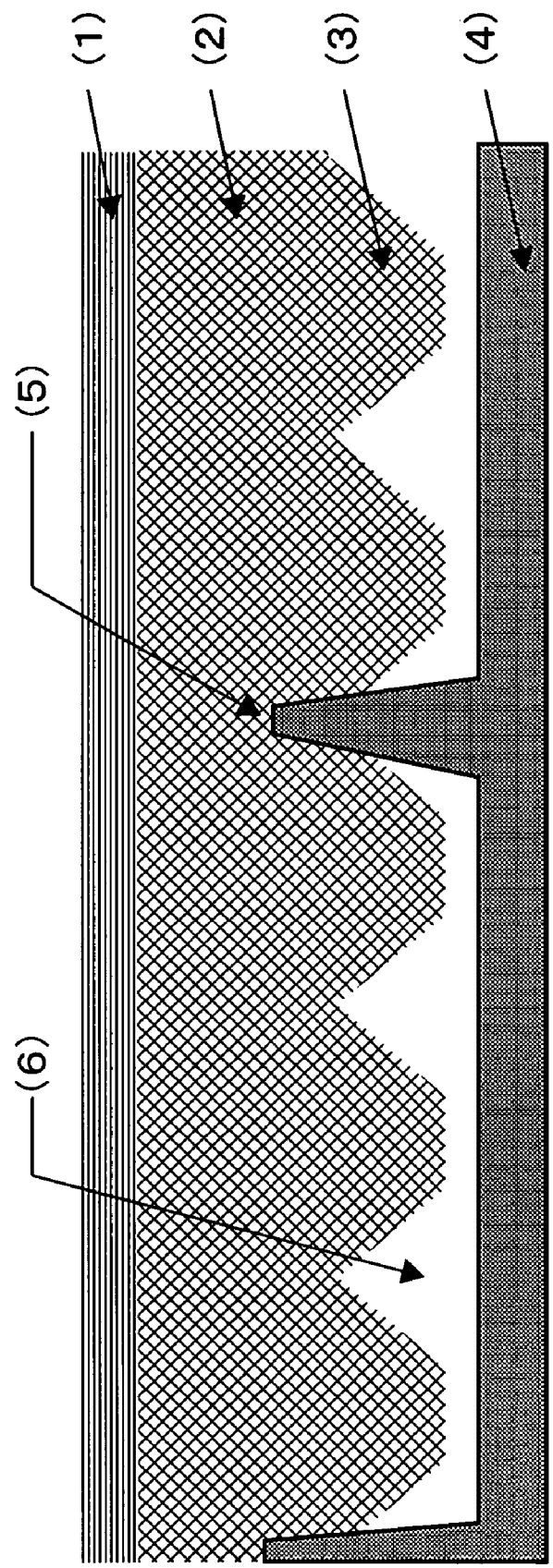
FIG. 3 is a diagram showing one example of the retroreflective sheeting with the triangular pyramidal frustum prism elements.

A preferred example of the structure of the inventive retroreflective sheeting with the triangular pyramidal frustum microprism elements is shown in FIG. 3, which is a cross-sectional view.

Referring to FIG. 3, the reference numeral (3) denotes a reflective element layer, in which the inventive triangular pyramidal frustum microprism elements (retroreflective elements) are disposed on one surface of the retroreflective sheeting in a close-packed state; the reference numeral (2) denotes a reflective element containing layer (prism sheet) containing the reflective elements. Generally, the reflective element layer (3) and the reflective element containing layer (2) are integrally formed. Alternatively, the layer (3) and the layer (2) may be independently formed one over the other. The retroreflective sheeting of the invention may be provided with a surface protective layer (1) for protecting the retroreflective sheeting from physical or chemical damages such as contamination, scratches, or degradation due to light exposure or heat; and a backing sheet (backing film) (4) for securing an air-tight sealing configuration on the backside surface of the reflective element (triangular pyramidal frustum prism element) layer, depending on the purpose of use or the environment for use. The retroreflective sheeting of the invention may be further provided with an adhesive layer and a releaser layer on the outer surface of the backing sheet (backing film) (4) to attach the retroreflective sheeting to a structural member.

The resin constituting the surface protective layer (1) of the inventive retroreflective sheeting may be identical to or different from the resin constituting the reflective element containing layer (prism sheet) (2). Alternatively, a UV absorber of the same kind as used in the reflective element containing layer (prism sheet) (2) may be added to enhance weatherability.

The backing film (backing sheet) (4) of the inventive retroreflective sheeting may have a plurality of airtight chambers on the backside surface of the reflective element (triangular pyramidal frustum prism element) layer (3) in which the air is sealed by firmly attaching the backing film (backing sheet) (4) to the film (reflective element containing layer) (2) having the reflective element layer at the positions corresponding to protruding supports (5), which are locally formed on the backing film (backing sheet) by emboss processing. Securing a boundary between the side surfaces (slant surfaces) of the reflective element (triangular pyramidal frustum prism element) and the air enables to meet the total internal reflection requirement for the microprism elements, thereby enhancing the retroreflection.

The resin for use in the backing film (4) of the inventive retroreflective sheeting may be identical to or different from the resin for use in the prism sheet (2).

The method for firmly attaching the backing sheet (4) to the reflective element containing layer (2) of the inventive retroreflective sheeting is not specifically limited. Well-known attaching methods such as a thermally-fusing-resin joining method, a thermosetting-resin joining method, a UV curing-resin joining method, or an electron-beam-curing-resin joining method may be applied.

Generally, it is known that the retroreflective performance of a retroreflective sheeting is lowered at a site where the reflective element layer (3) and the protruding support (5) are jointed to each other because the retroreflective sheeting cannot meet the total internal reflection requirement for microprism elements at the jointed site.

Figure 4:
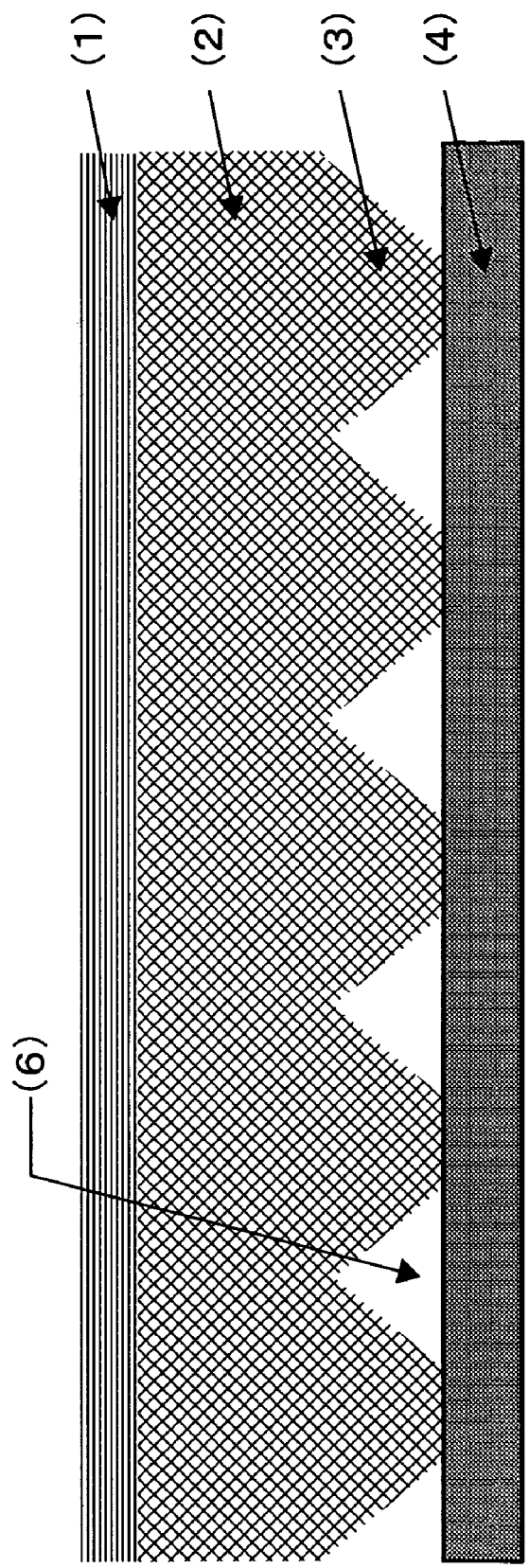
FIG. 4 is a diagram showing other example of the retroreflective sheeting with the triangular pyramidal frustum prism elements.

In the inventive retroreflective sheeting with the triangular pyramidal frustum elements, in the case where the top surface (c) of the triangular pyramidal frustum element is parallel to the bottom surface (b), as shown in FIG. 4, it is possible that: the backing film (4) is disposed adjacent the top surfaces (c) of the triangular pyramidal frustum elements without forming protruding supports by emboss processing; lowering of retroreflective performance is suppressed because the total internal reflection requirement for the side surfaces of the triangular pyramidal frustum elements is not obstructed; and enhanced adhesiveness is obtained.

The inventive retroreflective sheeting with the triangular pyramidal frustum prism elements does not have apex portions as the conventional triangular pyramid type prism elements, and therefore, there is no or less likelihood that the retroreflective performance varies due to abrasion of the apex or deformation of the prism, in storage of the resin film (resin sheet) formed with the prism pattern, or in firmly attaching the backing sheet.

As mentioned above, the inventive retroreflective sheeting having the features that the retroreflective layer containing the triangular pyramidal frustum prism elements in a close-packed state is formed on one surface of the retroreflective sheeting, and that the plural airtight chambers are provided with use of the backing film provides superior incident angularities and superior direction characteristics with no or less likelihood of halation even at a small incident angle. Thus, the inventive retroreflective sheeting with the triangular pyramidal frustum prism elements are advantageously used for signboards such as road signboards and construction site signboards, car license plates of automotive vehicles such as automobiles and motorcycles, safety materials such as collision warning signboards, clothing, and life jackets.

EXAMPLES

In the following, the invention will be described in further details by illustrating examples and comparative examples, which, however, do not delimit the invention.

Examples 1 to 7 and Comparative Examples 1 to 7

Retroreflective sheetings, in which triangular pyramidal frustum prism patterns were formed on acrylic resin sheets (product of Kaneka Corporation, Sunduren SD009NCT: thickness of 200 µm, total light transmittance of 92%), were produced with use of a female die, in which triangular pyramidal frustum prism-like recesses with the dimensions shown in Table 1 were arrayed in a close-packed state.

Specifically, prepared were diamond bites with the respective predetermined tipangles corresponding to the respective angles between the bottom surface and the adjacent side surfaces, which were calculated based on the dimensions shown in Table 1, and then, a copper-made male die was produced, in which a multitude of triangular pyramidal frustum prism-like protrusions with the height of 80 µm were arrayed in a close-packed state according to the following steps. Subsequently, a nickel-made female die formed with an inverse pattern to the pattern of the copper-made male die was produced by electroforming, using the male die. For instance, in Example 1, prepared were diamond bites of three kinds with the tipangles of 58 degrees, 86 degrees, and 92 degrees, respectively; and then arrays of parallel grooves with a V-shape in cross section were cut with a repeated pattern on a smoothly grinded surface of a copper plate of 200 mm×200 mm, with use of the diamond bite with the tipangle of 58 degrees so that the repeated pitch was 225 µm, and the depth of the groove was 100 µm. Thereafter, arrays of parallel grooves with a V-shape in cross section were cut with a repeated pattern in the copper plate, with use of the diamond bite with the tipangle of 86 degrees so that the repeated pitch was 230 µm, the depth of the groove was 100 µm, and the angle of the intersection with the side $a_1$ was 63 degrees. Then, arrays of parallel grooves with a V-shape in cross section were formed with a repeated pattern in the copper plate, with use of the diamond bite with the tipangle of 92 degrees so that the repeated pitch was 215 µm, the depth of the groove was 100 µm, the angle the intersection with the side $a_1$ was 66 degrees, and the angle the intersection with the side $a_2$ was 51 degrees. Then, upper portions of the obtained triangular pyramidal protrusions were cut off so that an upper flat plane of a triangular pyramidal frustum to be obtained was made parallel to a lower flat plane thereof, and that the distance between the upper flat plane and the lower flat plane was 80 µm.

Subsequently, using the obtained female die, the triangular pyramidal frustum prism pattern was transferred to the acrylic film by heat press, whereby retroreflective sheetings each of 200 mm×200 mm were produced. The below-mentioned evaluations were conducted with respect to the obtained retroreflective sheetings.

Comparative Example 8

The below-mentioned evaluations were conducted with respect to a glass beads type retroreflective sheeting i.e. Scotchlite #8910 (product of Sumitomo 3M Limited).

Comparative Example 9

The below-mentioned evaluations were conducted with respect to Scotchlite Diamond LDP Grade White (product of Sumitomo 3M Limited).

(Evaluation Method)

Calculation of Coefficient of Retroreflection

Retroreflective performance and the like were evaluated with respect to the retroreflective sheetings produced in Examples and Comparative Examples based on the following conditions.

Figure 5:
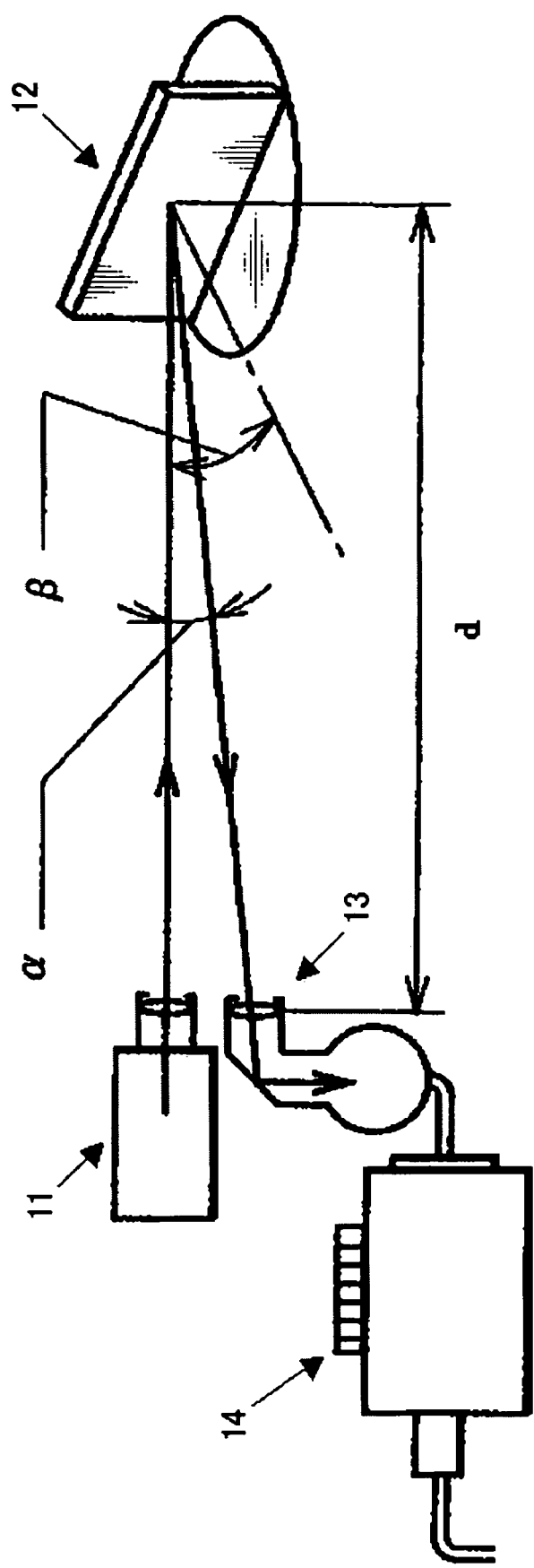
FIG. 5 is a conceptual diagram 1 showing a method for measuring a coefficient of retroreflection according to JIS Z8714.

The following items were measured according to JIS Z8714 based on the layout drawing shown in FIG. 5, and a coefficient of retroreflection of the retroreflective sheetings each was calculated in accordance with the formulae 1 and 2.

$$I = Er \cdot d^2 \quad (1)$$

$$R' = \frac{I}{En \cdot A} \quad (2)$$

where R': coefficient of retroreflection (unit: Cd/Lx·m$^2$)

I: luminance (unit: Cd) of a sample observed from a receiving position

Er: illuminance (unit: Lx) on the optical receiver at the layout position (incident angle α, observation angle β) shown in FIG. 5

En: illuminance (unit: Lx) on a flat plane perpendicular to incident' light at a center position of the sample d: distance (unit: m) from the center on the sample surface to the optical receiver A: area (unit: m$^2$) of the sample surface (1) Halation and Retroreflective Performance The retroreflective performance was evaluated based on a coefficient (A1) of retroreflection in a criterion of the observation angle of 0.2 degrees and the incident angle of 5 degrees. A larger coefficient of retroreflection indicates better retroreflective performance, but a coefficient of retroreflection of 900 Cd/Lx·m$^2$ or more was measured to cause halation.

The measurement criterion on halation was as follows:

○: coefficient of retroreflection of smaller than 900 Cd/Lx·m$^2$

X: coefficient of retroreflection of 900 Cd/Lx·m$^2$ or more (2) Incident Angularities Evaluations were made based on two criteria, wherein one criterion was the observation angle of 0.2 degrees and the incident angle of 5 degrees, and the other criterion was the observation angle of 1 degree and the incident angle of 30 degrees. Coefficients (A1 and B1) of Retroreflection in the respective criteria were calculated, and the ratio (B1/A1) of coefficients of retroreflection was defined as an index on incident angularities. A larger index indicates better incident angularities.

(3) Direction Characteristics

Figure 6:
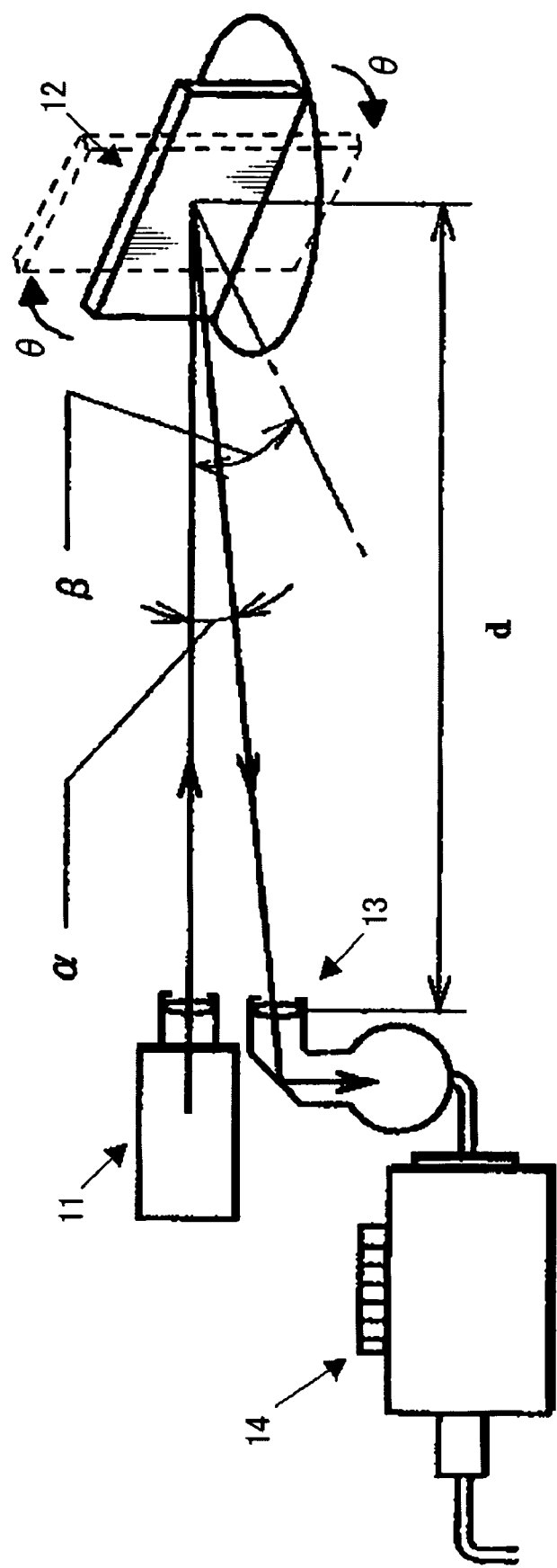
FIG. 6 is a conceptual diagram 2 showing a method for measuring a coefficient of retroreflection according to JIS Z8714.

In measuring a coefficient of retroreflection in a criterion of the observation angle of 1 degree and the incident angle of 30 degrees, a coefficient (B2) of retroreflection was calculated when the prism sheet is rotated by a rotation angle θ=90 degrees, as shown in FIG. 6. The ratio (B2/B1) of coefficients of retroreflection was defined as an index on direction characteristics. A larger index indicates better direction characteristics.

The evaluation results on Examples and Comparative Examples are shown in Table 2.

The inventive retroreflective sheetings with the triangular pyramidal frustum microprism elements as the reflective elements exhibit superior incident angularities and superior direction characteristics with no or less likelihood of halation even at a small incident angle, as shown in Table 2.

TABLE 1

|  |  | Examples |  |  |  |  |  |  | Comparative Examples |  |  |  |  |  |  |
|---|---|---|---|---|---|---|---|---|---|---|---|---|---|---|---|
|  |  | 1 | 2 | 3 | 4 | 5 | 6 | 7 | 1 | 2 | 3 | 4 | 5 | 6 | 7 |
| triangular bottom surface(b) | $a_1$ (μm) | 225 | 80 | 350 | 200 | 225 | 225 | 225 | 20 | 500 | 400 | 250 | 350 | 350 | 350 |
|  | $a_2$ (μm) | 230 | 120 | 350 | 200 | 230 | 225 | 230 | 20 | 500 | 400 | 250 | 350 | 350 | 350 |
|  | $a_3$ (μm) | 215 | 120 | 250 | 200 | 215 | 225 | 215 | 25 | 500 | 50 | 150 | 350 | 300 | 350 |
|  | difference between longest and shortest sides (μm) | 15 | 40 | 100 | 0 | 15 | 0 | 15 | 5 | 0 | 350 | 100 | 0 | 50 | 0 |
| length of edge | $d_1$ (μm) | 210 | 110 | 330 | 180 | 210 | 210 | 210 | 40 | 380 | 150 | 450 | 340 | 100 | 250 |
|  | $d_2$ (μm) | 155 | 105 | 350 | 180 | 155 | 155 | 155 | 30 | 380 | 145 | 400 | 350 | 80 | 100 |
|  | $d_3$ (μm) | 170 | 100 | 335 | 180 | 170 | 170 | 170 | 40 | 380 | 130 | 420 | 350 | 100 | 250 |
|  | length of longest edge (d) (μm) | 210 | 110 | 350 | 180 | 210 | 210 | 210 | 40 | 380 | 150 | 450 | 350 | 100 | 250 |
|  | difference between longest and shortest edges (μm) | 40 | 10 | 20 | 0 | 40 | 40 | 40 | 10 | 0 | 20 | 50 | 10 | 20 | 150 |
| distance between bottom surface(b) and top surface(c) | $e_1$ (μm) | 80 | 80 | 240 | 85 | 70 | 80 | 75 | 20 | 240 | 90 | 200 | 10 | 60 | 20 |
|  | $e_2$ (μm) | 80 | 80 | 240 | 85 | 70 | 80 | 85 | 20 | 240 | 90 | 200 | 10 | 60 | 20 |
|  | $e_3$ (μm) | 80 | 80 | 240 | 85 | 70 | 80 | 80 | 20 | 240 | 90 | 200 | 10 | 60 | 20 |
|  | longest distance (e)(μm) | 80 | 80 | 240 | 85 | 70 | 80 | 85 | 20 | 240 | 90 | 200 | 10 | 60 | 20 |
| angle between adjacent side surfaces | $f_1$ (degrees) | 90 | 87 | 92 | 90 | 90 | 90 | 90 | 90 | 90 | 87 | 92 | 89 | 100 | 82 |
|  | $f_2$ (degrees) | 90 | 87 | 92 | 90 | 90 | 90 | 90 | 90 | 90 | 87 | 92 | 89 | 100 | 82 |
|  | $f_3$ (degrees) | 90 | 87 | 92 | 90 | 90 | 90 | 90 | 90 | 90 | 87 | 92 | 89 | 100 | 82 |

TABLE 2

| | | | Examples | | | | | | Comparative Examples | | | |
|---|---|---|---|---|---|---|---|---|---|---|---|---|---|
| | | | 1 | 2 | 3 | 4 | 5 | 6 | 7 | 1 | 2 | 3 | 4 |
| coefficient of retroreflection | A1 | observation angle: 0.2° incident angle: 5° | 550 | 850 | 430 | 500 | 430 | 380 | 500 | 920 | 150 | 350 | 25 |
| | B1 | observation angle: 1° incident angle: 30° | 400 | 760 | 330 | 415 | 310 | 260 | 360 | 770 | 30 | 50 | 10 |
| | B2 | observation angle: 1° incident angle: 30° | 365 | 720 | 310 | 340 | 285 | 210 | 260 | 510 | 10 | 30 | 8 |
| halation | | | ○ | ○ | ○ | ○ | ○ | ○ | ○ | X | ○ | ○ | ○ |
| incident angularities (B1/A1) | | | 0.73 | 0.89 | 0.77 | 0.83 | 0.72 | 0.68 | 0.73 | 0.84 | 0.2 | 0.14 | 0.40 |
| direction characteristic (B2/B1) | | | 0.9 | 0.8 | 0.9 | 0.8 | 0.9 | 0.8 | 0.7 | 0.7 | 0.3 | 0.6 | 0.8 |

| | | | Comparative Examples | | | | | acceptable |
|---|---|---|---|---|---|---|---|---|
| | | | 5 | 6 | 7 | 8 | 9 | criterion |
| coefficient of retroreflection | A1 | observation angle: 0.2° incident angle: 5° | 15 | 20 | 20 | 70 | 1030 | |
| | B1 | observation angle: 1° incident angle: 30° | 5 | 10 | 10 | 28 | 40 | |
| | B2 | observation angle: 1° incident angle: 30° | 1 | 7 | 5 | 28 | 25 | |
| halation | | | ○ | X | ○ | ○ | X | A1 < 900 |
| incident angularities (B1/A1) | | | 0.33 | 0.50 | 0.50 | 0.40 | 0.04 | |
| direction characteristic (B2/B1) | | | 0.2 | 0.7 | 0.5 | 1.0 | 0.6 | 0.7 or more |

INDUSTRIAL APPLICABILITY

The inventive retroreflective sheeting having the features that the triangular pyramidal frustum prism elements are disposed on one surface of the retroreflective sheeting in a close-packed state, and that the plural airtight chambers are defined with use of the backing film exhibits superior incident angularities and superior direction characteristics with no or less likelihood of halation even at a small incident angle. Thus, the inventive retroreflective sheeting with the triangular pyramidal frustum prism elements is advantageously used for signboards such as road signboards and construction site signboards, car license plates of automotive vehicles such as automobiles and motorcycles, safety materials such as collision warning signboards, clothing, and life jackets.

The invention claimed is:

1. A retroreflective sheeting with triangular pyramidal frustum prism elements, which comprises a reflective element layer containing the triangular pyramidal frustum prism elements in a close-packed state formed on one surface thereof, and satisfies the following requirements:

the triangular pyramidal frustum prism element has a bottom surface with one side length thereof being in the range of 50 to 400 μm, and a difference between a longest side and a shortest side thereof being 200 μm or less;

the length of a longest edge of the triangular pyramidal frustum prism element is in the range of 30 to 400 μm, and a difference between the longest edge and a shortest edge among the three edges is 100 μm or less;

when a vertical line which intersects perpendicularly with the bottom surface is drawn from a top surface of the triangular pyramidal frustum prism element to the bottom surface thereof, the length of a longest vertical line is in the range of 20 to 250 μm; and an angle between adjacent side surfaces of the triangular pyramidal frustum prism element is in the range of 85 to 95 degrees.

2. A retroreflective sheeting according to claim 1, wherein the lengths of the three sides of the bottom surface of the triangular pyramidal frustum prism element are different one from another.

3. A retroreflective sheeting according to claim 1, wherein the area ratio of the top surface of the triangular pyramidal frustum prism element to the bottom surface thereof is in the range of 1/100 to 1/16.

4. A retroreflective sheeting according to claim 1, wherein the reflective element layer is formed on a resin film having a thickness in the range of 30 to 300 μm, and a total light transmittance of 20% or more.

5. A retroreflective sheeting according to claim 1, wherein the retroreflective sheeting has a backing film made of a resin, the backing film is locally attached to a film having the reflective element layer formed thereon via protruding supports provided by emboss processing in such a manner that an air is sealed between the reflective element layer and the backing film and that a plurality of airtight chambers are formed.

6. A retroreflective sheeting according to claim 1, wherein the backing film is placed adjacent on the top surfaces of the respective triangular pyramidal frustum prism elements without protruding supports.

7. A resin film for use in a retroreflective sheeting with triangular pyramidal frustum prism elements, which comprises a reflective element layer containing the triangular pyramidal frustum prism elements in a close-packed state formed on one surface thereof, wherein the triangular pyramidal frustum prism element has a bottom surface in the shape of a triangle, with one side length thereof being in the range of 50 to 400 μm, and a difference between a longest side and a shortest side thereof being 200 μm or less;

the length of a longest edge of the triangular pyramidal frustum prism element is in the range of 30 to 400 μm;

when a vertical line which intersects perpendicularly with the bottom surface is drawn from a top surface of the triangular pyramidal frustum prism element to the bottom surface thereof, the length of a longest vertical line is in the range of 20 to 250 μm; and an angle between adjacent side surfaces of the triangular pyramidal frustum prism element is in the range of 85 to 95 degrees.

8. A resin film according to claim 7, wherein the resin film is made of one or more resins selected from the group consisting of acrylic resin, polycarbonate resin, polystyrene resin, polyester resin, polyethylene resin, polypropylene resin, polyvinylchloride resin, polyarylate resin, polyurethane resin, epoxy resin, fluororesin, and cellulose resin, and the resin film has a thickness in the range of 30 to 300 μm, and a total light transmittance of 20% or more, and is capable of forming the reflective element layer thereon.

9. A resin film according to claim 7, wherein the resin film contains a UV absorber selected from benzotriazols, benzophenones, and triazines, a light stabilizer selected from hindered amines, an antioxidant, or a lubricant.

10. A resin film according to claim 7, wherein the resin film contains an organic dye or an organic pigment.

11. A resin film according to claim 9, wherein the antioxidant is a phenol or phosphate and the lubricant is a montanic ester or metal stearate salt.

12. A resin film according to claim 10, wherein the organic dye is selected from thioxanthenes, coumarins, perylenes, methines, benzopyrans, thioindigos, or anthraquinones and the organic pigment is an azo pigment or a phthalocyanine.

* * * * *